Feb. 13, 1940.        P. WIEBICKE        2,190,537
DIESEL MOTOR
Filed May 2, 1938
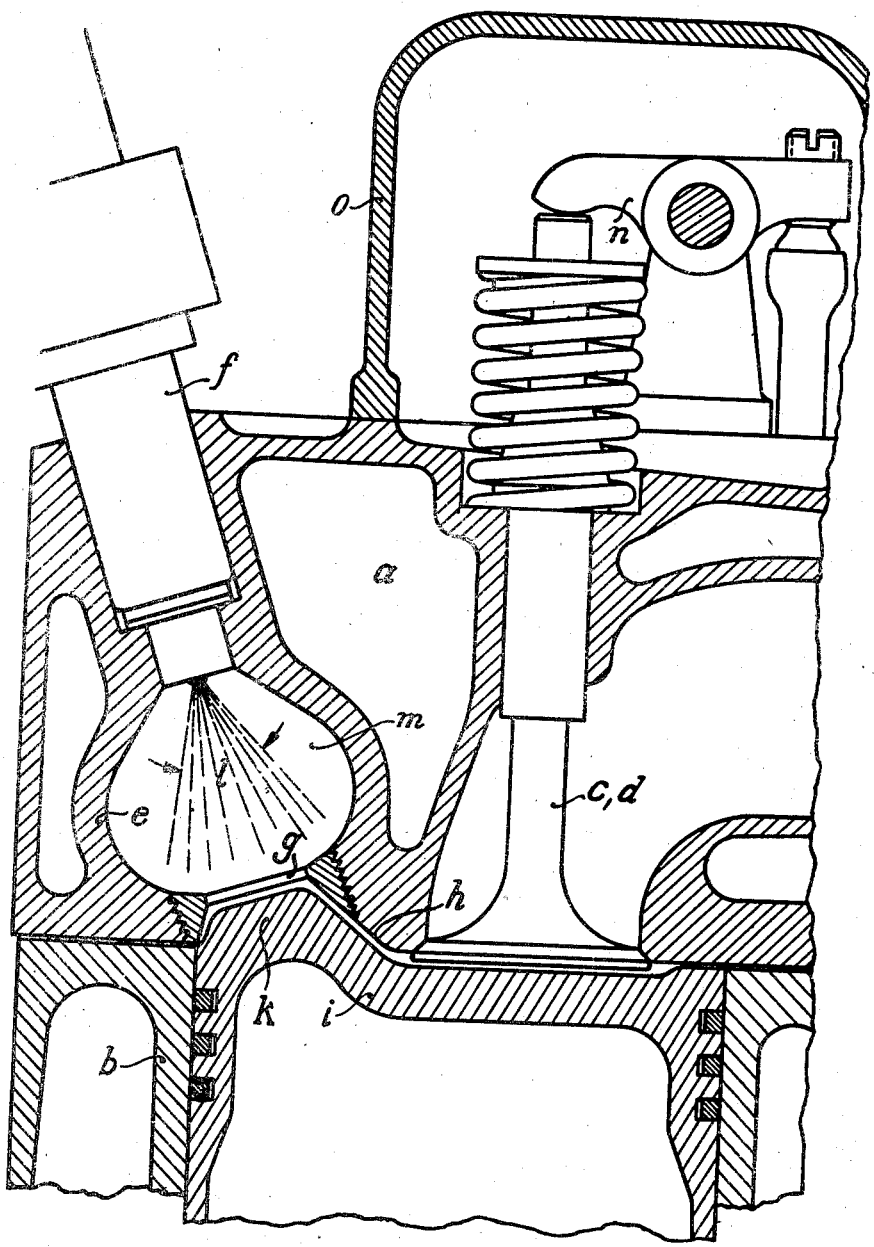
INVENTOR:
Paul WIEBICKE.
By: Alfred Müller
Attorney.

Patented Feb. 13, 1940

2,190,537

UNITED STATES PATENT OFFICE 2,190,537

DIESEL MOTOR

Paul Wiebicke, Nuremberg, Germany

Application May 2, 1938, Serial No. 205,438
In Germany May 3, 1937

1 Claim. (Cl. 123—32)

The invention relates to Diesel motors of the type having a combustion chamber distinct from the engine cylinder, and has generally in view to provide, in a Diesel motor of this type, a combustion chamber of substantially globular form, and a novel relationship between the fuel injection nozzle and said chamber and between said chamber and the engine cylinder, as well as between the engine piston and the passageway affording communication between said chamber and the cylinder, whereby there are obtained the advantages of higher efficiency, less noise in operation and the capacity to operate efficiently on lower grade fuels, as compared with known engines of said type.

The invention is illustrated diagrammatically and by way of example in the accompanying drawing which shows an axial section through the left-hand half of the top of a Diesel motor designed according to this invention.

In the drawing, $a$ denotes a cylinder head which is mounted on the cylinder $b$ in the usual manner and is provided in the usual manner with inlet and outlet valves, of which valves only one, designated as $c$, is shown in the drawing. Laterally from said valves is the approximately globular combustion chamber $e$, the axis of which is slightly inclined with respect to the axis of the cylinder so that the fuel nozzle may be inserted from the top of the cylinder head. The jet of fuel issuing from the nozzle is directed towards the transition aperture $g$, which establishes communication between the combustion chamber and the cylinder space. The diameter of this aperture is about one half the largest diameter of the chamber $e$. Between the aperture $g$ and the cylinder is a passageway $h$, which flares toward the cylinder so as to offer as little resistance as possible to combustion gases flowing from the chamber $e$ into the cylinder. On the bottom $i$ of the piston is provided a projection $k$, the size and shape of which is such that it substantially fills the passageway $h$ when the piston is at its limit of outward movement.

The jet angle $l$ is such, that it is surrounded within the chamber $e$ by an air space $m$. Moreover, the nozzle $f$, the chamber $m$, the aperture $g$, and the passageway $h$ are axially alined. Therefore, air flowing from the cylinder into the chamber $e$ through the passageway $h$ and the aperture $g$ is directly counter to the flow of the atomized fuel and tends to spread it, so that the fuel particles enter into the space $m$ and are uniformly distributed throughout the combustion chamber. There is, thus, attained by the present improved arrangement the important advantage, that the entire volume of air entering the combustion chamber is thoroughly intermixed with the atomized fuel, and the later, therefore, is completely burnt.

It is further to be observed that the upper face of the boss or projection $k$ is at right angles to the axis of the chamber $e$ and the projection $k$ so that, at the instant of explosion the high force exerted on the piston will be on a line intersecting the axis of the piston at a point remote from the cylinder head. By means of this arrangement, tendency of the piston to cock and produce slap in the cylinder, such as occurs upon an explosive force being exerted on one side of the piston parallel to the piston axis, is substantially eliminated.

On the top of the cover are the valve levers $n$ and above these levers is a hood $o$, which, however, does not cover the nozzle $f$, so that accessibility of the same is not impaired.

I claim:

A Diesel motor comprising a cylinder, a cylinder head, a piston reciprocable within said cylinder, said cylinder head having a substantially pear-shaped combustion chamber with its base towards the cylinder and a passageway affording communication between said chamber and the cylinder, said passageway flaring toward the cylinder and, where it opens into said chamber, being of smaller diameter than said chamber, said chamber and passageway being coaxial with their axes intersecting the axis of the cylinder at a point remote from said head, a frusto-conical projection on the piston to enter and to substantially completely fill said passageway when the piston is at its limit of outward movement, said projection being coaxial with the passageway at the limit of the outward movement of the piston and having its upper end face at right angles to its axis, and a fuel injection nozzle disposed to inject fuel into said combustion chamber from the outer end thereof and coaxial with said chamber, the combustion chamber being of a width greater than the jet of fuel delivered into the same by the fuel nozzle whereby, upon outward movement of the piston, air forced from the cylinder into said chamber counter to the delivery of fuel therein, causes the fuel to be spread throughout the combustion chamber and to become thoroughly intermixed with the air.

PAUL WIEBICKE.